United States Patent

Yamashita et al.

(10) Patent No.: US 6,185,353 B1
(45) Date of Patent: Feb. 6, 2001

(54) GRADED INDEX TYPE OPTICAL FIBERS AND METHOD OF MAKING THE SAME

(75) Inventors: Tomoyoshi Yamashita; Yasuteru Tahara; Kazuki Nakamura, all of Otake (JP)

(73) Assignee: Mitsubishi Rayon Co., Ltd., Tokyo (JP)

(*) Notice: Under 35 U.S.C. 154(b), the term of this patent shall be extended for 0 days.

(21) Appl. No.: 09/142,161

(22) PCT Filed: Mar. 28, 1997

(86) PCT No.: PCT/JP97/01093

§ 371 Date: Sep. 28, 1998

§ 102(e) Date: Sep. 28, 1998

(87) PCT Pub. No.: WO97/36196

PCT Pub. Date: Oct. 2, 1997

(30) Foreign Application Priority Data

Mar. 28, 1996 (JP) .................................................. 8-074269

(51) Int. Cl.[7] ................................ G02B 6/18; G02B 6/22
(52) U.S. Cl. .......................... 385/124; 264/1.29; 385/127; 385/143
(58) Field of Search ..................................... 385/124–127, 385/143, 145; 264/1.29

(56) References Cited

U.S. PATENT DOCUMENTS

| | | | |
|---|---|---|---|
| 4,768,857 | * 9/1988 | Sakunaga et al. | 385/115 |
| 5,235,660 | * 8/1993 | Perry et al. | 385/124 |
| 5,555,525 | * 9/1996 | Ho et al. | 385/143 |

FOREIGN PATENT DOCUMENTS

| | | |
|---|---|---|
| 1-265207 | * 10/1989 | (JP) . |
| 1-265208 | * 10/1989 | (JP) . |
| 6-3533 | * 1/1994 | (JP) . |

* cited by examiner

*Primary Examiner*—John D. Lee
(74) *Attorney, Agent, or Firm*—Oblon, Spivak, McClelland, Maier & Neustadt, P.C.

(57) ABSTRACT

A graded index type optical fiber having a multilayer structure comprising a plurality of concentrically arranged layers formed of (co)polymers selected from the group consisting of two or more homopolymers HP1, HP2, . . . , HPn derived from monomers M1, M2, . . . , Mn, respectively, and having refractive indices decreasing in that order, and one or more binary copolymers CP derived from these monomers, the multilayer structure being such that a mixed layer consisting of the (co)polymers constituting two adjacent layers is formed therebetween, and the refractive index is highest at the center and decreases gradually toward the outer periphery. This optical fiber can be continuously formed by feeding the (co)polymers to a multilayer concentric circular nozzle and thereby extruding them through the nozzle, and allowing the polymers to interdiffuse between adjacent layers of the fiber.

21 Claims, 1 Drawing Sheet

(a)

FIG. 1 position from the center

GRADED INDEX TYPE OPTICAL FIBERS AND METHOD OF MAKING THE SAME

TECHNICAL FIELD

This invention relates to graded index type plastic optical fibers which can be used as optical communication media.

BACKGROUND ART

Graded index type plastic optical fibers (hereinafter referred to as "GI type POFS") having a radial refractive index distribution in which the refractive index decreases gradually from the center toward the outer periphery of the optical fiber have a wider frequency bandwidth than step index type optical fibers, and are hence expected to be useful as optical communication media.

In the case of GI type POFs, one having a large numerical aperture (NA) and as small a transmission loss as possible needs to be manufactured for the purpose of improving its bending loss and its coupling loss with the light source. In order to increase NA, GI type POFs must be designed so that the maximum difference in refractive index ($\Delta n$) between the center and the outer periphery of the optical fiber is sufficiently large.

Various methods of making such GI type POFs are known. They include, for example, (1) a method which comprises providing two monomers having different reactivity ratios and giving homopolymers with different refractive indices, placing these monomers in a cylindrical vessel made of a polymer of these monomers so as to cause the polymer to be dissolved and swollen, polymerizing the monomers, and then drawing the resulting product (Japanese Patent Laid-Open No. 130904/'86); (2) a method which comprises preparing a plurality of polymer mixtures from two polymers having different refractive indices at various mixing ratios, spinning these polymer mixtures to form a multilayer fiber, and then heat-treating this fiber to effect interdiffusion between adjacent layers (Japanese Patent Laid-Open No. 265208/'89); and (3) a method which comprises winding films formed of a plurality of binary copolymers having different copolymerization ratios on a core material, and drawing the resulting laminate under heated conditions (Japanese Patent Publication No. 15684/'80).

The GI type POFs made by the above-described methods (1) or (2) have the disadvantage that, since all layers are formed of polymer mixtures, these plastic optical fibers (hereinafter referred to as "POFs") tend to produce a heterogeneous structure due to microscopic phase separation and hence show a large light scattering loss. On the other hand, the GI type POFs made by the method (3) and consisting of styrene-methyl methacrylate copolymers or the like have a large light scattering loss, because the difference in refractive index between the copolymers constituting adjacent layers of the multilayer fiber is too large (e.g., 0.02).

As the methods of making, the above-described method (1) is disadvantageous in that it requires a polymerization step and hence has low productivity. The method (3) is disadvantageous in that foreign matter tends to be introduced when a plurality of films are wound on a core material and in that it is difficult to obtain a concentric circular fiber because thickness discontinuities tend to occur at the joints between film ends.

On the other hand, the method (2) is excellent in that a GI type POF showing few thickness fluctuation can be continuously formed. However, it is difficult to create a gradual refractive index distribution in the POF, because sufficient polymer-to-polymer interdiffusion between adjacent layers cannot be achieved by the post-spinning heat treatment alone. Even if the heat-treating temperature is raised to increase the thickness of the interdiffusion layers and thereby to create a gradual refractive index distribution profile, the fiber drawn during spinning tends to undergo relaxation shrinkage and show variations in fiber diameter. Consequently, light leakage and scattering occur in the parts showing variation in diameter, resulting in an increased transmission loss.

DISCLOSURE OF THE INVENTION

An object of the present invention is to provide a technique by which GI type POFs showing few thickness fluctuation and having a small light scattering loss and a relatively large numerical aperture can be made at a high production rate.

According to the present invention, there is provided a graded index type optical fiber having a multilayer structure comprising a plurality of concentrically arranged layers each of said layers is formed of one (co)polymer selected from the group consisting of two or more homopolymers HP1, HP2, ..., HPn (in which n is an integer of 2 or greater) derived from monomers M1, M2, ..., Mn, respectively, and having refractive indices decreasing in that order, and one or more binary copolymers CPs derived from the monomers, the multilayer structure being such that a mixed layer consisting of mixture of two (co)polymers constituting two adjacent layers is formed therebetween, and the refractive index is highest at the center and decreases gradually toward the outer periphery.

According to the present invention, there is also provided a method of making a graded index type optical fiber which comprises the steps of preparing a plurality of spinning materials having different refractive indices, each of said spinning materials being made of one (co)polymer, by using (co)polymers selected from the group consisting of two or more homopolymers HP1, HP2, ..., HPn (in which n is an integer of 2 or greater) derived from monomers M1, M2, ..., Mn, respectively, and having refractive indices decreasing in that order, and one or more binary copolymers CPs derived from the monomers; feeding the spinning materials to a multilayer concentric circular nozzle so that the refractive index decreases toward the outer periphery, and thereby extruding them through the nozzle; and allowing the polymers to interdiffuse between adjacent layers of the fiber, within the nozzle and/or after being extruded from the nozzle.

In the aforesaid POF and its method of making, terpolymers TPs derived from three monomers including the two monomers constituting the aforesaid binary copolymers CPs may further be used in addition to the binary copolymers CPs. Alternatively, such terpolymers TPs may be used in place of the binary copolymers CPs.

BRIEF DESCRIPTION OF THE DRAWINGS

In FIG. 1, (a) is a cross-sectional view, (b) is a longitudinal sectional view, and (c) is a diagram showing the distribution of refractive indices in the radial direction.

BEST MODE FOR CARRYING OUT THE INVENTION

In the present invention, HP represents a homopolymer, CP represents a binary copolymer, BP represents a mixture of two (co)polymers, $L_{NB}$ represents a non-mixed layer formed of a single (co)polymer, and $L_B$ represents a mixed layer formed of a mixture of two (co)polymers.

First of all, in order to facilitate the understanding of the present invention, a description is given of the embodiment in which the number (n) of monomers is 3. Where the number (n) of monomers is 3, three homopolymers HP1, HP2 and HP3 are prepared from monomers M1, M2 and M3, respectively. Moreover, two series of binary copolymers CP1/2 and CP2/3 are prepared from combinations of monomers giving homopolymers having refractive indices close to each other. It is preferable to select these HPs and CPs so that each CP or HP has good compatibility with other CPs.

In the present invention, the polymers having higher refractive indices are homopolymer HP1 derived from monomer M1, and binary copolymer CP1/2 derived from monomers M1 and M2. With respect to CP1/2, a plurality of copolymers composed of the two monomers at different molar ratios and having different refractive indices may be prepared. Similarly, the polymers having lower refractive indices are homopolymer HP3 derived from monomer M3, and binary copolymer CP2/3 derived from monomers M2 and M3. Also with respect to CP2/3, a plurality of copolymers composed of the two monomers at different molar ratios and having different refractive indices may be prepared.

Figure 1:
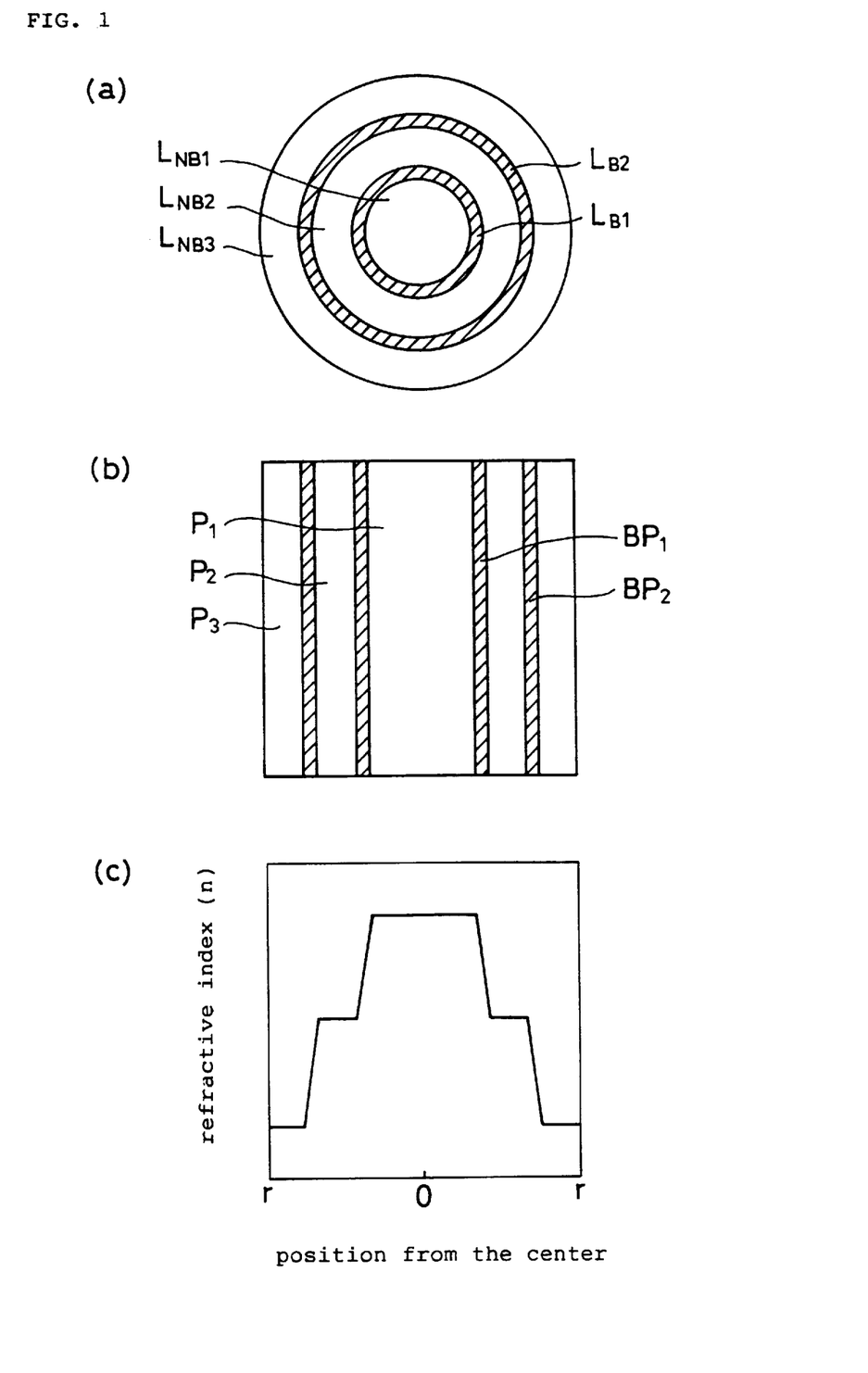
FIG. 1 includes schematic views illustrating a graded index type optical fiber in accordance with the present invention.

As illustrated in FIG. 1, the multilayer POFs of the present invention has a structure in which non-mixed layers ($L_{NB}$) having a thickness $T_{NB}$ and mixed layers ($L_B$) having a thickness $T_B$ are alternately arranged. In this structure, each non-mixed layer ($L_{NB}$) is a layer formed of a single (co)polymer, and each mixed layer ($L_B$) is a layer formed of a mixture (BP) of the two (co)polymers constituting the non-mixed layers disposed on both sides thereof.

If the number of non-mixed layers ($L_{NB}$) is increased, a structure having essentially no mixed layer ($L_B$) may be employed. However, when the number of non-mixed layers ($L_{NB}$) is small, it is necessary to form one or more mixed layers ($L_B$) and, moreover, increase their thicknesses $T_B$ to some degree so that an abrupt change in refractive index may be avoided.

FIG. 1 illustrates a POF having a five-layer structure comprising three non-mixed layers ($L_{NB}$) and two mixed layers ($L_B$). As can be seen from FIG. 1(c), the refractive index remains constant in each non-mixed layer ($L_{NB}$), while it changes continuously in each mixed layer ($L_B$). As the number of layers is increased, the refractive index distribution profile in the whole POF becomes more gradual. A gradual refractive index distribution curve is preferable for the purpose of increasing the light transmission bandwidth. However, if the proportion of the mixed layers ($L_B$) in the POF is too large, its light transmission loss will be increased. Accordingly, the profile of the refractive index distribution is chosen with consideration for the balance between the magnitude of the light transmission bandwidth and the magnitude of the light transmission loss.

Moreover, a protective layer or a jacket material layer may be disposed on the outer periphery of the GI type POF, though they are not shown in FIG. 1.

First of all, BPs constituting the mixed layers ($L_B$) are explained. Generally, BPs tend to induce fluctuations in refractive index and a phase separation (which may hereinafter be suitably referred to as "a heterogeneous structure"), as compared with HPs and CPs. Consequently, the light scattering loss of the whole POF is increased as the proportion of $L_B$ in the POF becomes larger. Moreover, BPs generally has worse thermal stability of than HPs and CPs. Consequently, when the POF is used in a relatively high temperature region for a long period of time, the presence of $L_B$ in the POF promotes the creation of a heterogeneous structure in the POF and increases its light scattering loss.

Thus, since the light scattering loss of the whole POF is increased as the proportion of $L_B$ in the POF becomes larger, it is preferable that the proportion of $L_B$ in the POF be smaller and the thickness $T_B$ of each $L_B$ be also smaller. The desirable value of $T_B$ may vary according to the radial position of $L_B$ and may also depend on the desired bandwidth performance and the number of layers. However, $T_B$ is preferably in the range of about 0.3 to 100 μm and more preferably about 1 to 10 μm.

It is also preferable that the HP (or CP) and CP forming each BP have good compatibility and the difference in refractive index therebetween be sufficiently small.

Next, the polymers (i.e., HPs and CPs) constituting the non-mixed layers ($L_{NB}$) are explained. It is preferable that the (co)polymers constituting $L_{NB}$ in the POF have a small light scattering loss. In order to obtain (co)polymers having a small light scattering loss, the polymers (or monomers) should preferably be chosen so that the difference in refractive index between HP1 and HP2 and between HP3 and HP2 is as small as possible. The reason for this is that, if the difference in refractive index between HP1 and HP2 (or between HP3 and HP2) is large, the polymer mixture (BP) of HP1 and HP2 or the copolymer (CP1/2) of M1 and M2 shows fluctuations in refractive index and hence causes an increase in the light scattering loss of the POF.

Table 1 shows isotropic light scattering losses (dB/km) at a wavelength of 650 nm for copolymers formed from 80 mole % of methyl methacrylate (MMA) used as M2 and 20 mole % of various monomers used as M1 or M3. Table 1 also shows the differences in refractive index ($\Delta n_d$) between the homopolymers derived from these monomers and polymethyl methacrylate (PMMA). In this table, the $\Delta n_d$ value is positive when the refractive index of the relevant homopolymer is larger than that of PMMA, and negative when the refractive index of the relevant homopolymer is smaller than that of PMMA.

TABLE 1

| Monomers | Compositional ratio (wt. %) | Isotropic light scattering loss (dB/km) | Difference in refractive index ($\Delta n_d$) between corresponding homopolymer |
|---|---|---|---|
| MMA/VB | 74.42/25.58 | 3725 | 0.0867 |
| MMA/PhMA | 69.39/30.61 | 1867 | 0.0798 |
| MMA/2-PhEMA | 67.87/32.13 | 81.7 | 0.0684 |
| MMA/BzA | 70.44/29.56 | 95.4 | 0.0676 |
| MMA/GMA | 74.04/25.96 | 10.2 | 0.0265 |
| MMA/CEMA | 72.07/27.93 | 20.7 | 0.0262 |
| MMA/THFMA | 72.10/27.90 | 13.1 | 0.0188 |
| MMA/CHMA | 72.60/27.40 | 13.5 | 0.0158 |
| MMA | 100 | 10.8 | 0.0000 |
| MMA/IBMA | 75.79/24.21 | 27.2 | −0.0138 |
| MMA/TBMA | 72.85/27.15 | 143.7 | −0.0270 |

(Note 1)
VB: Vinyl benzoate
PhMA: Phenyl methacrylate
2-PhEMA: 2-Phenylethyl methacrylate
BzA: Benzyl acrylate
GMA: Glycidyl methacrylate
CEMA: Chloroethyl methacrylate TABLE 1-continued

| Monomers | Compositional ratio (wt. %) | Isotropic light scattering loss (dB/km) | Difference in refractive index ($\Delta n_d$) between corresponding homopolymer |
|---|---|---|---|

THFMA: Tetrahydrofurfuryl methacrylate
CHMA: Chlorohexyl methacrylate
IMBA: Isobutyl methacrylate
TBMA: tert-Butyl methacrylate As is evident from this table, the isotropic light scattering losses of the copolymers tend to decrease as the absolute value of the difference in refractive index ($\Delta n_d$) becomes smaller. Accordingly, the two monomers constituting each binary copolymer CP used in the POF of the present invention must be ones giving homopolymers HPs between which there is a small difference in refractive index. Specifically, the difference in refractive index is preferably not greater than 0.03, more preferably not greater than 0.02, and most preferably not greater than 0.015. However, if the difference in refractive index is decreased to an undue extent, the NA will become too small. Accordingly, it is necessary to select a combination of monomers M1 and M2 (or monomers M3 and M2) with consideration for this fact. For this reason, the difference in refractive index is preferably not less than 0.010.

Moreover, in the multilayer POF of the present invention which includes mixed layers ($L_B$), an abrupt change in refractive index at the mixed layers ($L_B$) is suppressed as the difference in refractive index between adjacent non-mixed layers ($L_{NB}$) becomes smaller, and this reduces the light scattering losses at the interfaces. Accordingly, it is preferable that the difference in refractive index between adjacent non-mixed layers ($L_{NB}$) be as small as possible. Specifically, the difference in refractive index is preferably not greater than 0.016 and more preferably not greater than 0.008.

It is also preferable that BPs constituting the mixed layers ($L_B$) in the POF have a small light scattering loss. A mixture having a small light scattering loss can be obtained by enhancing the mutual compatibility of the (co)polymers being mixed.

One means to this end is to minimize the difference in copolymerization ratio between the HP (or CP) and CP constituting adjacent non-mixed layers ($L_{NB}$). In a mixture BP composed of (co)polymers between which there is a large difference in copolymerization ratio, the properties of one CP (or HP) are substantially different from those of the other CP. Consequently, their mutual compatibility is reduced and a heterogeneous structure tends to be produced in the BP, resulting in an increased light scattering loss of the POF. Actually, the difference in copolymerization ratio is determined at a value which causes substantially no problem for practical purposes, with consideration for the proportion of the mixed layers ($L_B$) in the whole POF.

Table 2 shows isotropic light scattering losses at a wavelength of 650 nm for BPs prepared by selecting two members from among HPs and various CPs having different compositions and mixing them at a ratio of 50/50 (wt. %). The aforesaid HPs and CPs were formed from 2,2,2-trifluoroethyl methacrylate (3FM) or 2,2,3,3-tetrafluoropropyl methacrylate (4FM) used as M1, and 2,2,3,3,3-pentafluoropropyl methacrylate (5FM) used as M2.

In this table, the (co)polymer derived from monomers M1 and M2 is the homopolymer HP1 of M1 when the content of M2 is 0 mole %, and the homopolymer HP2 of M2 when the content of M1 is 0 mole %. The difference in copolymerization ratio between two copolymers A and B having different copolymerization ratios is expressed by the difference in the molar content (%) of M1 or M2.

Table 2 indicates that, as the copolymerization ratio of one CP (or HP) is closer to that of the other CP mixed therewith, the resulting BP has a smaller isotropic light scattering loss. With respect to M1 or M2 contained in any two adjacent (co)polymers, the difference in copolymerization ratio is preferably not greater than 20 mole %, more preferably not greater than 15 mole %, and most preferably not greater than 10 mole %. However, if the difference in copolymerization ratio is extremely small, it may be necessary to increase the number of (co)polymer layers for the purpose of securing the desired NA of the optical fiber.

TABLE 2

| Monomers M1/M2 | Monomer ratio of copolymer 1 (mole %) | Monomer ratio of copolymer 2 (mole %) | Difference in M1 content between copolymers 1 and 2 (mole %) | Isotropic light scattering loss of mixture of copolymers 1 and 2 (dB/km) |
|---|---|---|---|---|
| 3FM/5FM | 40/60 | 30/70 | 10 | 60–80 |
| 3FM/5FM | 45/55 | 30/70 | 15 | 70–100 |
| 3FM/5FM | 50/50 | 30/70 | 20 | 80–140 |
| 3FM/5FM | 50/50 | 0/100 | 50 | >10000 (cloudy) |
| 3FM/5FM | 50/50 | 100/0 | 50 | >10000 (cloudy) |
| 4FM/5FM | 40/60 | 30/70 | 10 | 60–80 |
| 4FM/5FM | 45/55 | 30/70 | 15 | 80–110 |
| 4FM/5FM | 50/50 | 30/70 | 20 | 90–150 |
| 4FM/5FM | 50/50 | 0/100 | 50 | >10000 (cloudy) |
| 4FM/5FM | 50/50 | 100/0 | 50 | >10000 (cloudy) |

In the present invention, high or low refractive indices are used on a relative basis. For example, when MMA is used as M2 and, therefore, PMMA having a refractive index of 1.491 is used as HP2, the monomers which can be used as M1 and M3 are exemplified below. The $n_d$ values given in parentheses represent the refractive indices of the corresponding homopolymers.

Examples of monomer M1 used to form a polymer having a high refractive index include benzyl methacrylate ($n_d$=1.5680), phenyl methacrylate ($n_d$=1.5706), vinyl benzoate ($n_d$=1.5775), styrene ($n_d$=1.5920), 1-phenylethyl methacrylate ($n_d$=1.5490), 2-phenylethyl methacrylate ($n_d$=1.5592), diphenylmethyl methacrylate ($n_d$=1.5933), 1,2-diphenylethyl methacrylate ($n_d$=1.5816), 1-bromoethyl methacrylate ($n_d$=1.5426), benzyl acrylate ($n_d$=1.5584), α,α-dimethylbenzyl methacrylate ($n_d$=1.5820), p-fluorostyrene ($n_d$=1.566), 2-chloroethyl methacrylate ($n_d$=1.5170), isobornyl methacrylate ($n_d$=1.505), adamantyl methacrylate ($n_d$=1.535), tricylodecyl methacrylate ($n_d$=1.523), 1-methylcyclohexyl methacrylate ($n_d$=1.5111), 2-chlorocyclohexyl methacrylate ($n_d$=1.5179), 1,3-dichloropropyl methacrylate ($n_d$=1.5270), 2-chloro-1-chloromethylethyl methacrylate ($n_d$=1.5270), bornyl methacrylate ($n_d$=1.5059), cyclohexyl methacrylate ($n_d$=1.5066), tetrahydrofurfyl methacrylate ($n_d$=1.5096), allyl methacrylate ($n_d$=1.5196), tetrahydrofurfuryl methacrylate ($n_d$=1.5096), vinyl chloroacetate ($n_d$=1.5120), glycidyl methacrylate ($n_d$=1.517) and methyl α-chloroacrylate ($n_d$=1.5172).

Examples of monomer M3 used to form a polymer having a low refractive index include 2,2,2-trifluoroethyl methacrylate ($n_d$=1.415), 2,2,3,3-tetrafluoropropyl methacrylate ($n_d$=1.422), 2,2,3,3,3-pentafluoropropyl methacrylate ($n_d$=1.392), 2,2,2-trifluoro-1-trifluoromethylethyl methacrylate ($n_d$=1.380), 2,2,3,4,4,4-hexafluorobutyl methacrylate ($n_d$=1.407), 2,2,3,3,4,4,5,5-octafluoropentyl methacrylate ($n_d$=1.393), 2,2,2-trifluoroethyl α-fluoroacrylate ($n_d$=1.386), 2,2,3,3-tetrafluoropropyl α-fluoroacrylate ($n_d$=1.397), 2,2,3,3,3-pentafluoropropyl α-fluoroacrylate ($n_d$=1.366), 2,2,3,3,4,4,5,5-octafluoropentyl α-fluoroacrylate ($n_d$=1.376), o- or p-difluorostyrene ($n_d$=1.4750), vinyl acetate ($n_d$=1.4665), tert-butyl methacrylate ($n_d$=1.4638), isopropyl methacrylate ($n_d$=1.4728), hexadecyl methacrylate ($n_d$=1.4750), isobutyl methacrylate ($n_d$=1.4770), α-trifluoromethylacrylates, β-fluoroacrylates, β,β-difluoroacrylates, β-trifluoromethylacrylates, β,β-bis(trifluoromethyl)acrylates and α-chloroacrylates.

Preferably, the monomers used to prepare the (co)polymers constituting the GI type POF of the present invention are ones giving homopolymers with a glass transition temperature (Tg) of 70° C. or above. If Tg is unduly low, the thermal resistance of the whole POF will be reduced. As a result, there is a possibility that, in a service environment having relatively high temperatures, phase separation, especially in the $L_B$ layers, may be accelerated to cause an increase in scattering loss. Examples of such high-Tg (co)polymers include (co)polymers derived from a combination of methyl methacrylate and chloroethyl methacrylate.

Especially preferred examples of (co)polymers which have a small difference in refractive index between HPs and hence cause a small scattering loss in POFs include (co)polymers derived from a combination of two or three fluoroalkyl (meth)acrylates. Similarly, they also include (co)polymers derived from a combination of monomers selected from chlorohexyl methacrylate, tetrahydrofurfuryl methacrylate, glycidyl methacrylate, isobutyl methacrylate and methyl methacrylate, and having different copolymerization ratios.

Furthermore, examples of (co)polymers which have a large difference in refractive index between HPs but exhibit good compatibility include (co)polymers derived from 2-phenylethyl methacrylate and methyl methacrylate, and having different copolymerization ratios.

No particular limitation is placed on the difference in refractive index between the center and the outer periphery of the GI type POF of the present invention. However, in view of the magnitude of the numerical aperture (NA), it is preferable that the difference in refractive index be in the range of about 0.02 to 0.04.

Now, the method of making a GI type POF in accordance with the present invention is described below.

According to this method, each spining material is prepared from one (co)polymer and three or more, preferably five or more, spinning materials having different refractive indices are prepared by using (co)polymers selected from the group consisting of two or more homopolymers HP1, HP2, ..., HPn (in which n is an integer of 2 or greater) derived from monomers M1, M2, ..., Mn, respectively, and having refractive indices decreasing in that order, and one or more binary copolymers CPs derived from the monomers. Then, these spinning materials are fed to a multilayer concentric circular nozzle having three or more, preferably five or more, layers so that the refractive index decreases toward the outer periphery, and thereby extruded through the nozzle.

In order to create a gradual refractive index distribution profile between adjacent layers, mixed layers must be formed by polymer-to-polymer interdiffusion between adjacent layers. To this end, the following procedure is employed. For example, the spinning materials are melted within the spinning nozzle, and the spinning materials constituting any two adjacent layers are brought into contact with each other for a relatively long period of time to effect polymer-to-polymer interdiffusion, and then extruded therefrom. However, when the number of layers is sufficiently large, no positive treatment for effecting polymer-to-polymer interdiffusion between adjacent layers is required.

Where a gradual refractive index distribution curve is not obtained owing to insufficient interdiffusion within the nozzle, the extruded fiber may be heat-treated again to effect additional polymer-to-polymer interdiffusion. However, when this method is employed, the fiber should preferably be extruded from the spinning nozzle in an undrawn state so as to prevent relaxation shrinkage of the fiber during heat treatment. The reason for this is that change in fiber diameter increase the light transmission loss of the POF.

The heat treatment may be carried out, for example, in the following manner. First, the undrawn fiber is heat-treated at a temperature over 100° C. higher than the average glass transition temperature (Tg) of the (co)polymers constituting it to effect interdiffusion. Then, the fiber is drawn in a temperature range extending from Tg to a temperature about 80° C. higher than Tg, so as to impart flexural strength to the fiber. Thus, there can be obtained a GI type POF.

Furthermore, in order to increase the thicknesses of the mixed layers, there may be employed a method which comprises adding to each spinning material a monomer mixture having the same composition as the (co)polymer constituting the spinning material and a photopolymerization initiator, extruding the resulting spinning materials through a nozzle so as to allow the monomers to interdiffuse between adjacent layers, and then photopolymerizing the monomers within the fiber.

The refractive index profile of the POF can be controlled by varying the residence time within the spinning nozzle, the melt spinning temperature, the post-spinning heat-treating temperature, the draw ratio during spinning, the types of the resinous components, and the number of concentric cylindrical layers of spinning materials (hereinafter referred to as "spinning material layers").

Now, the design method for manufacturing a GI type POF having an ideal refractive index profile (i.e., the conditions giving the widest bandwidth) is described below with respect to the relationship between the multilayer concentric cylindrical arrangement of spinning materials within the spinning nozzle and the refractive indices thereof. However, it is to be understood that the present invention is not limited by the following description.

Let us consider a GI type POF in which the refractive index decreases gradually from the center toward the outer periphery. If the refractive index at the center is designated by $n_1$, the lowest refractive index at the outer periphery by $n_2$, the radius by (a), and the position (or distance) from the center by r (0<r<a), and if it is assumed that $\Delta=(n_1-n_2)/n_1$, the conditions which impart the widest bandwidth to the POF are such that the refractive index profile, n(r), is approximated by the following equation.

$$n(r)=n_1\{1-2\Delta(r/a)^2\}^{0.5} \qquad (1)$$

That is, if the values of $n_1$, $n_2$ and (a) are determined, the ideal refractive index profile within the POF can be determined according to equation (1). Moreover, if the ratio of the diameter (b) of the spinning nozzle to the diameter (c) of the extruded and drawn POF is designated by $\alpha$ ($1<\alpha=b/c$), the refractive index profile, n'(r), to be formed within the spinning nozzle (in which the core diameter is $\alpha a$) is described by the following equation.

$$n'(r)=n_1\{1-2\Delta(r/\alpha a)^2\}^{0.5} \quad (2)$$

Accordingly, the radial position $r_j$ (j=1, 2, 3, . . . ) in the spinning nozzle at which a spinning material polymer j having a refractive index $n'_j$ is arranged can be determined by substituting $n'_j$ for n'(r) and $r_j$ for r in equation (2). Thus, the following equation is obtained.

$$r_j=\alpha a[\{1-(n_j/n_1)^2\}/2\Delta]^{0.5} \quad (3)$$

In this case, the number (N) of spinning material layers depends on the core radius ($\alpha a$) within the nozzle and the interdiffusion distance (L) of the spinning material polymers. It is reasonable that N is equal to ($\alpha a/2L$). If ($\alpha a$) is significantly large as compared with L, this would be rather undesirable because feeder of the spinning material polymers to the nozzle and control of the spinning conditions are complicated to cause an increase in production cost. Moreover, if N<<$\alpha a/2L$, the interdiffusion distance will be short relative to the thicknesses of the spinning material layers. Consequently, the desired refractive index profile cannot be satisfactorily formed, so that the resulting POF will have a worse transmission bandwidth. However, to avoid a high production cost and a troublesome production process, multilayer spinning comprising about 5 to 10 layers is considered to be proper from a practical point of view. The POF formed in this manner has a somewhat stepwise refractive index profile. Its bandwidth performance does not reach that of a POF having the ideal refractive index profile of equation (1), but fully meets the requirements for practical purposes.

According to the method of the present invention, a multicore fiber may also be formed by extruding such multilayer fibers simultaneously through a plurality of nozzles disposed in close proximity to each other.

While the embodiment in which the number (n) of monomers is 3 has been described above, the difference in refractive index between the center and the outer periphery of a GI type POF can be easily increased by increasing n to 4 or greater, so that a higher NA can be achieved easily.

Moreover, even if the number (n) of monomers is 2, a GI type POF having a small light scattering loss can be formed by selecting a combination of two monomers giving homopolymers between which there is a small difference in refractive index.

As the (co)polymers constituting the non-mixed layers ($L_{NB}$) of the GI type POF of the present invention, terpolymers TPs may also be used in order, for example, to improve the thermal resistance and mechanical strength of the POF. That is, terpolymers TPs derived from three monomers including the two monomers constituting the aforesaid binary copolymers CPs may further be used in addition to the binary copolymers CPs. Alternatively, such terpolymers TPs may be used in place of the binary copolymers CPs.

The present invention is further illustrated by the following examples.

EXAMPLE 1

Four monomeric components were used in this example. They included glycidyl methacrylate (GMA) giving a homopolymer with a refractive index ($n_d$) of 1.5174 and a glass transition temperature (Tg) of 46° C., cyclohexyl methacrylate (CHMA) giving a homopolymer with an nd of 1.5066 and a Tg of 83° C., MMA giving a homopolymer with an $n_d$ of 1.4908 and a Tg of 112° C., and isobutyl methacrylate (IBMA) giving a homopolymer with an $n_d$ of 1.4770 and a Tg of 48–53° C. In each binary copolymers, therefore, the difference in refractive index ($\Delta n_d$) between the two homopolymers was as follows.

GMA/CHMA ($\Delta n_d$=0.0108)
CHMA/MMA ($\Delta n_d$=0.0158)
MMA/IBMA ($\Delta n_d$=0.0138)

The following eight monomers and monomer mixtures (with mixing ratios expressed in percent by weight) were subjected to polymerization reaction.

1) GMA/CHMA=17.44/82.56
2) CHMA
3) CHMA/MMA=87.05/12.95
4) CHMA/MMA=71.59/28.41
5) CHMA/MMA=52.83/47.17
6) CHMA/MMA=29.58/70.42
7) MMA
8) MMA/IBMA=73.80/26.20

Monomer mixture solutions were prepared by adding 500 μl of n-dodecyl mercaptan as a molecular weight controller (or chain transfer agent) to 100 g of each of the monomers or monomer mixtures, and further adding thereto 0.11 g of azobis(dimethylvaleronitrile) as a low-temperature initiator and 8.00 μl of di-tert-butyl peroxide as a high-temperature initiator. In order to obtain polymers useful as spinning materials, these monomer mixture solutions were subjected to two-step radical polymerization. That is, they were polymerized under an atmosphere of nitrogen at 70° C. for 5 hours in such a way as to. cause no foaming. After the degree of polymerization reached 90% by weight or greater, they were polymerized at 130° C. for 40 hours. The resulting polymers had a weight-average molecular weight of about 100,000 to 140,000 on the basis of measurements by GPC, and their residual monomer content was 1% by weight or less.

Subsequently, these eight spinning materials were fed to an extruder, melted at 240° C., and extruded through a composite spinning nozzle having an eight-layer concentric cylindrical structure. This spinning nozzle is designed so that an eight-layer concentric cylindrical structure is formed at a position 500 mm before the nozzle tip from which the fiber in its molten state is extruded. Moreover, this nozzle is fabricated so that its internal diameter decreases gradually over a length of 100 mm extending from the aforesaid position in the direction of extrusion. Finally, starting from a position 400 mm before the tip, the diameter of the nozzle remains constant at 2 mm. Basically, a gradual refractive index distribution profile is created by polymer-to-polymer interdiffusion while the molten polymers flow through this 400 mm section. The temperature of this spinning nozzle section is strictly controlled by dividing it into four equal subsections having a length of 100 mm. The temperature of the 100 mm subsection adjoining the spinning nozzle tip was adjusted to 230° C. so as to secure the stability of spinning, and the temperature of the other three subsections was adjusted to 240° C. so as to promote the polymer-to-polymer interdiffusion.

The extrusion speed of the polymers was 40 mm/min and the residence time of the polymers in the spinning nozzle section having a diameter of 2 mm was about 10 minutes. The extruded fiber was drawn so as to give a final diameter of 1 mm, and taken up by means of a wind-up machine.

The POF formed in the above-described manner was cut at a length of 0.1 km to measure its −3 dB transmission bandwidth. Thus, it was found to be 900 MHz. This transmission bandwidth measurement was made at a launch NA of 0.85 by using an optical sampling oscilloscope (manufactured by Hamamatsu Photonics Co., Ltd.) and a light source comprising a Semiconductor Laser TOLD 9410 (manufactured by Toshiba Corp.) with an emission wavelength of 650 nm. Moreover, its transmission loss was 160 dB/km. This transmission loss measurement was made at a wavelength of 650 nm and a launch NA of 0.1 according to the 100 m/5 m cut-back method. The same measuring conditions were also employed in the following examples.

The numerical aperture (NA) of this GI type POF was 0.25. Moreover, the thickness of each mixed layer in the POF was about 1–3 $\mu$m.

EXAMPLE 2

A multicore fiber having a sea-and-island structure was made by using, as the islands, nine POFs each of which has the same multilayer structure as described in Example 1. However, the copolymer composed of MMA and IBMA in a ratio of 73.80:26.20 and disposed on the outermost side in Example 1 was used as the sea material. Accordingly, except for the sea material, the structure of the islands consisted essentially of the part of the fiber of Example 1 extending from its center to the seventh layer. The average diameter of the islands was about 0.5 mm, and the diameter of the whole multicore fiber was 3.0 mm. The transmission loss of this multicore fiber was 250 dB/km, and its transmission bandwidth per island at a length of 0.1 km was 650 MHz. The thickness of each mixed layer in the POFs was about 1–3 $\mu$m.

EXAMPLE 3

Three monomeric components were used in this example. They included 2,2,3,3-tetrafluoropropyl methacrylate (4FM) giving a homopolymer with a refractive index ($n_d$) of 1.4215 and a Tg of 64° C., 2,2,3,3,3-pentafluoropropyl methacrylate (5FM) giving a homopolymer with an $n_d$ of 1.3920 and a Tg of 67° C., and 2-(perfluorooctyl)ethyl methacrylate (17FM) giving a homopolymer with an $n_d$ of 1.3732. In each binary copolymer system, therefore, the difference in refractive index ($\Delta n_d$) between the two homopolymers was as follows.

4FM/5FM ($\Delta n_d$=0.0295)
5FM/17FM ($\Delta n_d$=0.0188)

The following eight monomer and monomer mixtures (with mixing ratios expressed in percent by weight) were subjected to polymerization reaction.

1) 4FM/5FM=57.92/42.08
2) 4FM/5FM=45.86/54.14
3) 4FM/5FM=34.04/65.96
4) 4FM/5FM=22.46/77.54
5) 4FM/5FM=11.12/88.88
6) 5FM
7) 5FM/17FM=78.67/21.33
8) 5FM/17FM=62.11/37.89

According to the same procedure as described in Example 1, these monomers and monomer mixtures were polymerized and spun to form a POF. The transmission bandwidth of this POF was 1.1 GHz, its transmission loss was 140 dB/km, and the thickness of each mixed layer was about 1–3 $\mu$m.

EXAMPLE 4

Two monomeric components were used in this example. They included 2,2,2-trifluoroethyl methacrylate (3FM) giving a homopolymer with a refractive index ($n_d$) of 1.4146 and a Tg of 75° C., and 2,2,3,3,3-pentafluoropropyl methacrylate (5FM) giving a homopolymer with an $n_d$ Of 1.3920 and a Tg of 67° C. In the binary copolymer, therefore, the difference in refractive index ($\Delta n_d$) between the two homopolymers was 0.0226. The following eight monomers and monomer mixtures (with mixing ratios expressed in percent by weight) were subjected to polymerization reaction.

1) 3FM
2) 3FM/5FM=82.56/17.44
3) 3FM/5FM=66.46/33.54
4) 3FM/5FM=51.56/48.44
5) 3FM/5FM=37.72/62.28
6) 3FM/5FM=24.83/75.17
7) 3FM/5FM=12.80/87.20
8) 5FM

According to the same procedure as described in Example 1, these monomers and monomer mixtures were polymerized and spun to form a POF. The transmission bandwidth of this POF was 1.9 GHz, its transmission loss was 110 dB/km, and the thickness of each mixed layer was about 1–3 $\mu$m.

EXAMPLE 5

Two monomers, i.e. 4FM and 5FM, were used in this example. The following eight monomer and monomer mixtures (with mixing ratios expressed in mole percent) were subjected to polymerization reaction. In this case, the difference in refractive index ($\Delta n_d$) between the two homopolymers was 0.0295.

1) 4FM/5FM=70/30
2) 4FM/5FM=60/40
3) 4FM/5FM=50/50
4) 4FM/5FM=40/60
5) 4FM/5FM=30/70
6) 5FM/5FM 20/80
7) 5FM/5FM=10/90
8) 5FM

Using the resulting eight polymers as spinning materials, a POF was formed in the same manner as described in Example 1. The transmission bandwidth of this POF was 1.5 GHz, its transmission loss was 120 dB/km, and the thickness of each mixed layer was about 1–3 $\mu$m.

EXAMPLE 6

Two monomeric components were used in this example. They included chloroethyl methacrylate (CEMA) giving a homopolymer with an $n_d$ of 1.517 and a Tg of 92° C., and MMA giving a homopolymer with an $n_d$ of 1.491 and a Tg of 112° C. The following eight monomer and monomer mixtures (with mixing ratios expressed in mole percent) were subjected to polymerization reaction. In this case, the difference in refractive index ($\Delta n_d$) between the two homopolymers was 0.026.

1) CEMAIMMA=84/16
2) CEMA/MMA=72/28
3) CEMA/MMA=60/40
4) CEMA/MMA=48/52
5) CEMA/MMA=36/64
6) CEMA/MMA=24/76
7) CEMA/MMA=12/88
8) MMA

Using the resulting eight polymers as spinning materials, a POF was formed in the same manner as described in Example 1. The transmission bandwidth of this POF was 1.2 GHz, its transmission loss was 155 dB/km, and the thickness of each mixed layer was about 1–3 μm.

EXAMPLE 7

Three monomeric components were used in this example. They included tetrahydrofurfuryl methacrylate (THFMA) giving a homopolymer with an $n_d$ of 1.510 and a Tg of 60° C., MMA giving a homopolymer with an $n_d$ of 1.491 and a Tg of 112° C., and isobutyl methacrylate (IBMA) giving a homopolymer with an $n_d$ of 1.477 and a Tg of 48–53C. The following eight monomer and monomer mixtures (with mixing ratios expressed in mole percent) were subjected to polymerization reaction.

1) THFMA/MMA=80/20
2) THFMA/MMA=60/40
3) THFMA/MMA=40/60
4) THFMA/MMA=20/80
5) MMA
6) MMA/IBMA=80/20
7) MMA/IBMA=60/40
8) MMA/IBMA=40/60

Using the resulting eight polymers as spinning materials, a POF was formed by spinning them in the same manner as described in Example 1. The transmission bandwidth of this POF was 1.2 GHz, its transmission loss was 190 dB/km, and the thickness of each mixed layer was about 1–3 μm.

EXAMPLE 8

Two monomeric components were used in this example. They included 2-phenylethyl methacrylate (2-PhEMA) giving a homopolymer with an $n_d$ of 1.559, and MMA giving a homopolymer with an $n_d$ of 1.491 and a Tg of 112° C. The following eight monomer and monomer mixtures (with mixing ratios expressed in mole percent) were subjected to polymerization reaction.

1) 2-PhEMA/MMA=35/65
2) 2-PhEMA/MMA=30/70
3) 2-PhEMA/MMA=25/75
4) 2-PhEMA/MMA=20/80
5) 2-PhEMA/MMA=15/85
6) 2-PhEMA/MMA=10190
7) 2-PhEMA/MMA=5/95
8) MMA

Using the resulting eight polymers as spinning materials, a POF was formed by spinning them in the same manner as described in Example 1. The transmission bandwidth of this POF was 1.3 GHz, its transmission loss was 200 dB/km, and the thickness of each mixed layer was about 1–3 μm.

EXAMPLE 9

Two monomeric components were used in this example. They included 2,2,2-trifluoro-1-trifluoromethylethyl methacrylate (iso-6FM) giving a homopolymer with an $n_d$ of 1.380 and a Tg of 78° C., and 2,2,2-trifluoroethyl methacrylate (3FM) giving a homopolymer with an $n_d$ of 1.415 and a Tg of 75° C. The following eight monomer and monomer mixtures (with mixing ratios expressed in mole percent) were subjected to polymerization reaction.

1) 3FM
2) iso-6FM/3FM=10/90
3) iso-6FM/3FM=20/80
4) iso-6FM/3FM=30/70
5) iso-6FM/3FM=40/60
6) iso-6FM/3FM=50/50
7) iso-6FM/3FM=60/40
8) iso-6FM/3FM=70/30

Using the resulting eight polymers as spinning materials, a POF was formed by spinning them in the same manner as described in Example 1. The transmission bandwidth of this POF was 1.0 GHz, its transmission loss was 130 dB/km, and the thickness of each mixed layer was about 1–3 μm.

EXAMPLE 10

Two monomeric components were used in this example. They included chloroethyl methacrylate (CEMA) giving a homopolymer with an $n_d$ of 1.517 and a Tg of 92° C., and methyl methacrylate (MMA) giving a homopolymer with an $n_d$ of 1.491 and a Tg of 112° C. The following six monomer and monomer mixtures (with mixing ratios expressed in mole percent) were subjected to polymerization reaction.

1) CEMA/MMA=80/20
2) CEMA/MMA=64/36
3) CEMA/MMA=48/52
4) CEMA/MMA=32/68
5) CEMA/MMA=16/84
6) MMA

Each of these six monomer and monomer mixtures was thermally polymerized until a degree of polymerization of about 50% was reached. Thus, highly viscous monomer/polymer mixed syrups were prepared.

Subsequently, after the addition of a photopolymerization initiator, these six mixed syrups were fed to the same multilayer spinning nozzle as used in Example 1, except that the spinning nozzle had a six-layer concentric cylindrical structure and its temperature was adjusted to 40° C. After being extruded, the aforesaid syrups were photopolymerized by UV irradiation. Thus, their polymerization was completed to form a POF.

The transmission bandwidth of this POF was 2.1 GHz, its transmission loss was 140 dB/km, and the thickness of each mixed layer was about 30 μm.

EXAMPLE 11

Three monomeric components were used in this example. They included cyclohexyl methacrylate (CHMA) giving a homopolymer with an $n_d$ of 1.5066 and a Tg of 83° C., MMA giving a homopolymer with an $n_d$ of 1.491 and a Tg of 112° C., and isobutyl methacrylate (IBMA) giving a homopolymer with an $n_d$ of 1.477 and a Tg of 48–53° C. The following eight monomers and monomer mixtures (with mixing ratios expressed in mole percent) were subjected to polymerization reaction.

1) CHMA/IBMA/MMA=70/10/20
2) CHMA/IBMA/MMA=60/20/20
3) CHMA/IBMA/MMA=50/30/20
4) CHMA/IBMA/MMA=40/40/20
5) CHMA/IBMA/MMA=30/50/20
6) CHMA/IBMA/MMA=20/60/20
7) CHMA/IBMA/MMA=10/70/20
8) CHMA/IBMA/MMA=0/80/20

Using the resulting eight polymers as spinning materials, a POF was formed by spinning them in the same manner as described in Example 1. The transmission bandwidth of this POF was 1.1 GHz, its transmission loss was 180 dB/km, and the thickness of each mixed layer was about 1–3 μm.

Exploitability in Industry

The present invention can provide GI type POFs having a small light scattering loss and a relatively large numerical aperture. Moreover, the method for forming POFs in accordance with the present invention has high productivity.

What is claimed is:

1. A graded index type optical fiber having a multilayer structure, comprising:
    a plurality of concentrically arranged layers, each of said layers being formed of one (co)polymer selected from the group consisting of two or more homopolymers HP1, HP2, . . . Hpn (in which n is an integer of 2 or greater) derived from monomers M1, M2, . . . , Mn, respectively, and having refractive indices decreasing in that order, and one or more binary copolymers CP derived from said monomers, said multilayer structure being such that a mixed layer consisting of a mixture of two (co)polymers each of which constitutes the polymer of one of the two adjacent layers is formed therebetween, and the refractive index is highest at the center and decreases gradually toward the outer periphery.

2. An optical fiber as claimed in claim 1 wherein said optical fiber has a multilayer structure comprising a plurality of concentrically arranged layers each of said layers is formed of one (co)polymer selected from the group consisting of one or more binary copolymers CP1/2 having different copolymerization ratios and refractive indices, one or more binary copolymers CP2/3 having different copolymerization ratios and refractive indices, and homopolymers HP1, HP2 and HP3, said binary copolymers and homopolymers being derived from three monomers M1, M2 and M3 each giving a homopolymer with a glass transition temperature of 70° C. or above.

3. An optical fiber as claimed in claim 1 wherein said optical fiber has a multilayer structure comprising three or more concentrically arranged layers formed of (co)polymers which are derived from two monomers each giving a homopolymer with a glass transition temperature of 70° C. or above, and which have different copolymerization ratios and refractive indices.

4. An optical fiber as claimed in claim 1 wherein said optical fiber has a multilayer structure comprising a plurality of concentrically arranged layers formed of (co) polymers selected from the group consisting of one or more binary copolymers CP1/2 having different copolymerization ratios and refractive indices, one or more binary copolymers CP2/3 having different copolymerization ratios and refractive indices, and homopolymers HP1, HP2 and HP3, said binary copolymers and homopolymers being derived from three monomers giving homopolymers in which the difference in refractive index between any two homopolymers is 0.03 or less.

5. An optical fiber as claimed in claim 1 wherein said optical fiber has a multilayer structure comprising three or more concentrically arranged layers formed of (co)polymers which are derived from two monomers giving homopolymers with a difference in refractive index of 0.03 or less, and which have different copolymerization ratios and refractive indices.

6. An optical fiber as claimed in claim 1 wherein the difference in refractive index between the (co)polymers constituting any adjacent layers is 0.016 or less.

7. An optical fiber as claimed in claim 1 which is formed of (co)polymers derived from three fluoroalkyl (meth) acrylates.

8. An optical fiber as claimed in claim 1 which is formed of (co)polymers derived from two fluoroalkyl (meth) acrylates.

9. An optical fiber as claimed in claim 1 which is formed of (co)polymers derived from a combination of methyl methacrylate and a monomer selected from chloroethyl methacrylate and 2-phenylethyl methacrylate.

10. An optical fiber as claimed in claim 1 which is formed of (co)polymers derived from a combination of monomers selected from chlorohexyl methacrylate, tetrahydrofurfuryl methacrylate, glycidyl methacrylate, isobutyl methacrylate and methyl methacrylate.

11. A multicore optical fiber having a sea-and-island structure comprising an island component consisting of the graded index type optical fiber as claimed in claim 1 and a sea component in which a plurality of the island components are disposed.

12. An optical fiber as claimed in claim 1 wherein the difference in copolymerization ratio between the (co) polymers constituting any adjacent layers is not greater than 20 mole %.

13. A graded index type optical fiber having a multilayer structure, comprising:
    a plurality of concentrically arranged layers, each of said layers being formed of one (co)polymer selected from the group consisting of three or more homopolymers HP 1, HP2, . . . Hpn (in which n is an integer of 3 or greater) derived from monomers M1, M2, . . . , Mn, respectively, and having refractive indices decreasing in that order, one or more binary copolymers CP derived from said monomers, and one or more terpolymers TP derived from said monomers, said multilayer structure being such that a mixed layer consisting of a mixture of two (co)polymers each of which constitutes the polymer of one of the two adjacent layers is formed therebetween, and the refractive index is highest at the center and decreases gradually toward the outer periphery.

14. A method of making a graded index type optical fiber, which comprises:
    preparing a plurality of spinning materials having different refractive indices, each of said spinning materials being made of one (co)polymer, by using (co)polymers selected from the group consisting of two or more homopolymers HP1, HP2, . . . Hpn (in which n is an integer of 2 or greater) derived from monomers M1, M2, . . . , Mn, respectively, and having refractive indices decreasing in that order, and one or more binary copolymers CP derived from said monomers;
    feeding said spinning materials to a multilayer concentric circular nozzle so that the refractive index decreases toward the outer periphery, and thereby extruding them through said nozzle; and
    allowing the polymers to interdiffuse between adjacent layers of the fiber within said nozzle, after extrusion from said nozzle or within the nozzle and after the polymer material is extruded from the nozzle.

15. A method of making an optical fiber as claimed in claim 14 wherein five or more (co)polymers having different refractive indices are used.

16. A method of making an optical fiber as claimed in claim 14 wherein three or more (co)polymers having different copolymerization ratios and refractive indices are used, said (co)polymers being derived from two monomers giving homopolymers HP1 and HP2 in which the difference in refractive index is not greater than 0.03.

17. A method of making an optical fiber as claimed in claim 14 wherein the (co)polymers are derived from two or more monomers giving homopolymers in which the difference in refractive index between two homopolymers having the refractive indices closest to each other is not greater than 0.02.

18. A method of making an optical fiber as claimed in claim 14 wherein the difference in refractive index between two (co)polymers fed to adjacent nozzle orifices of said multilayer concentric circular nozzle is not greater than 0.016.

19. A method of making an optical fiber as claimed in claim 14 wherein the difference in copolymerization ratio between two (co)polymers fed to adjacent nozzle orifices of said multilayer concentric circular nozzle is not greater than 20 mole %.

20. A method of making a graded index type optical fiber, which comprises:

preparing a plurality of spinning materials having different refractive indices, each of said spinning materials being made of one (co)polymer, by using (co)polymers selected from the group consisting of three or more homopolymers HP1, HP2, . . . Hpn (in which n is an integer of 3 or greater) derived from monomers M1, M2, . . . , Mn, respectively, and having refractive indices decreasing in that order, one or more binary copolymers CP derived from said monomers, and one or more terpolymers TP derived from said monomers;

feeding said spinning materials to a multilayer concentric circular nozzle so that the refractive index decreases toward the outer periphery, and thereby extruding them through said nozzle; and allowing the polymers to interdiffuse between adjacent layers of the fiber within said nozzle, after extrusion from said nozzle or within said nozzle and after the polymer material is extruded from said nozzle.

21. A method of making a graded index type optical fiber which comprises the steps of preparing a plurality of spinning materials having different refractive indices, each of said spinning materials being made of one (co)polymer, said each spinning materials containing a (co)polymer selected from the group consisting of two or more homopolymers HP1, HP2, . . . , HPn (in which n is an integer of 2 or greater) derived from monomers M1, M2, . . . , Mn, respectively, and having refractive indices decreasing in that order, and one or more binary copolymers CP derived from said monomers, and further containing monomer mixtures having the same composition as each said (co)polymer, and a photopolymerization initiator; feeding said spinning materials to a multilayer concentric circular nozzle so that the refractive index decreases toward the outer periphery, and thereby extruding them through said nozzle; allowing said monomers to interdiffuse between adjacent layers of the fiber; and photopolymerizing said monomers.

* * * * *